(12) United States Patent
Furudate et al.

(10) Patent No.: US 6,288,459 B1
(45) Date of Patent: Sep. 11, 2001

(54) VIBRATION GENERATING DEVICE, AND METHOD FOR MOUNTING WEIGHT TO THE SAME

(75) Inventors: Toshio Furudate; Yuji Inada; Shinichi Hosobuchi, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/271,788

(22) Filed: Mar. 18, 1999

(30) Foreign Application Priority Data

Mar. 18, 1998 (JP) .................................................. 10-068441
Dec. 11, 1998 (JP) .................................................. 10-352622

(51) Int. Cl.⁷ .................................................. H02K 7/075
(52) U.S. Cl. .................................. 310/42; 310/81; 29/598
(58) Field of Search .................................. 310/81, 42, 51; 29/596, 598; 74/87; 340/407.1

(56) References Cited

U.S. PATENT DOCUMENTS 3,344,293 * 9/1967 Wahl ......................................... 74/87

5,338,996 * 8/1994 Yamamoto ............................. 310/217

FOREIGN PATENT DOCUMENTS

| 8-205466 | 4/1994 | (JP) . | |
|---|---|---|---|
| 06098496A | * 4/1994 | (JP) | ....................................... 310/81 |
| 07107699A | * 4/1994 | (JP) | ....................................... 310/81 |
| 08205466A | * 4/1994 | (JP) | ....................................... 310/81 |
| 7-184247 | * 7/1995 | (JP) | ....................................... 310/81 |
| 07288946 | 10/1995 | (JP) . | |
| 7-288946 | * 10/1995 | (JP) | ....................................... 310/81 |
| 8-111960 | * 4/1996 | (JP) | ....................................... 310/81 |
| 08205466 | 8/1996 | (JP) . | |
| 10313549 | 11/1998 | (JP) . | |

* cited by examiner

Primary Examiner—Karl Tamai
(74) Attorney, Agent, or Firm—Brinks Hofer Gilson & Lione

(57) ABSTRACT

A vibration generating device having a weight which is formed semicircular in section and provided with a recess in the vicinity of an insertion hole of a shaft. The weight, after insertion on the shaft, is supported in an inclined position on a support block. Then, a tapered pressing member is moved downwardly to apply the pressure to the recess. In this case, the direction of pressure application of the pressing member is deviated from the axis of the shaft.

2 Claims, 6 Drawing Sheets

VIBRATION GENERATING DEVICE, AND METHOD FOR MOUNTING WEIGHT TO THE SAME

BACKGROUND OF THE INVENTION

1. Field of the Invention

The present invention relates to a vibration generating device adapted to be built in a game controller or the like for vibrating the controller itself or for alerting signal reception in a portable cellular telephone or a pager unit, and a method for mounting a weight to the vibration generating device.

2. Description of Related Art

FIG. 8 is a front view for explaining a method of mounting a weight to a motor shaft in a conventional vibration generating device, showing the state of the weight before mounting. FIG. 9 is a front view showing the state of the weight after mounting.

The conventional weight 10 stated above has a body 11 of a semicircular columnar section, and is provided with a U-groove 4 formed at the center in the diametral direction of the body 11, for the insertion of a motor shaft 3. On both sides of the U-groove 4 projections 13a and 13b are formed upwardly.

When the aforesaid weight 10 is mounted on the shaft 3, the shaft 3 is inserted first into the U-groove 4 of the weight 10 and supported in position. Next, a support block 1 is used to support the weight 10 thereon. The supporting surface of the support block 1 has the same configuration as the perimeter (curved portion) of the weight 10, so that the perimeter of the weight 10 will be fitted in the curved portion 1a of the support block 1, with the flat portion of the weight 10 held level.

Subsequently a pressing member 12 with a recess portion 12a of a triangular section is lowered from above the weight 10 until the weight 10 is fastened on the shaft 3. That is, the surface area of the recess portion 12a formed in the forward end of the pressing member 12 is formed smaller than the surface area formed by the projections 13a and 13b and by a space between the projections 13a and 13b. Therefore the recess portion 12a of the pressing member 12 is fed downwardly into contact with the tips of the projections 13a and 13b and is further pressed downwardly to bend both projections 13a and 13b inwardly (in the directions of the arrows R and L), thereby caulking the weight 10 to the shaft 3.

However, the conventional weight 10 and the method of mounting the same as shown in FIGS. 8 and 9 have the problem that the vibration generating device is suitable for use where the weight 10 is produced of a relatively soft material such as copper. In the case of the weight 10 produced of a relatively hard material such as iron, a great load is required when the weight 10 is mounted to the shaft 3.

If a small load is applied when mounting the weight 10 to the shaft 3, the weight 10 mounted by a conventional method can easily be removed from the shaft 3 with a relatively little force; it is likely, therefore, that when a motor using the weight 10 is in practical use, the weight 10 will move out of position on the shaft 3 during rotation (during use), producing a noise or coming off from the shaft to impair the device itself.

In the weight 10 having the U-groove 4 shown in FIGS. 8 and 9, the inside wall surface of the U-groove 4 is formed straight, and therefore it is necessary to largely deform the straight inside wall surface into a curved surface along the perimeter of the shaft 3 by applying a pressure by the pressing member 12, that is, by applying a great load to the projections 13a and 13b. Therefore the projections 13a and 13b, if applied with a little load, will be insufficiently deformed, resulting in a small contact surface area between the inside wall surface of the U-groove 4 and the curved surface of the shaft 3. Consequently the mounting pressure will decrease and the weight 10 will come off the shaft 3 if a weight mounted is a large type and accordingly an increased load is applied to the weight.

SUMMARY OF THE INVENTION

An object, therefore, of the present invention is to provide a vibration generating device in which a weight produced of a hard material such as iron requires little pressure of the pressing member to caulk the weight, and will not accidentally move off position during use, and also to provide a method of mounting the weight to the vibration generating device.

The vibration generating device of the present invention is a vibration generating device mounted with a vibration generating weight on a motor shaft. In the vibration generating device, the weight is provided with a shaft insertion hole of an approximately semicircular section which is partly open at the center in a radial direction, and a recess portion for caulking located in the vicinity of the open portion of the insertion hole. With the shaft inserted in the insertion hole, a pressure is applied to the recess formed on the weight or the open end side of the recess, thereby securely fastening the shaft in the insertion hole.

By the above-described method, the weight can be firmly attached to the shaft with a pressure less than that in the conventional method even if the weight is produced of a hard material such as iron. Furthermore cost reduction is realized because the weight can be produced of a low-cost material such as iron. Furthermore, since iron is easily workable to a desired accuracy and less liable to deformation, the weight is hard to accidentally come off the shaft.

In the case stated above, the inside wall surface of the insertion hole enclosing the shaft is desired to be formed larger in angle than 180 degrees.

The weight thus formed, when pressed to deform, can be held in surface contact with the shaft. That is, the inside wall surface of the insertion hole, being formed as an approximately same curved surface as the shaft, makes a surface contact with the curved surface of the shaft when pressed to deform. Therefore, as compared with the conventional weight having the U-groove, the weight of the present invention can be mounted much more firmly on the motor shaft.

It is desirable that a clearance between the inside wall surface of the insertion hole and the shaft be $1/100$ mm or more and $8/100$ mm or less, and more desirable that the clearance be $3/100$ mm or more and $5/100$ mm or less.

The weight formed as described above, when pressed, is able to be firmly and reliably fastened on the shaft. If the clearance, however, is under $1/100$ mm, it is impossible to provide a working accuracy, resulting in difficult shaft insertion into the insertion hole of the weight. Conversely if the clearance exceeds $8/100$ mm, the contact surface area between the inside wall surface of the insertion hole and the shaft becomes small at the time of pressure application, with the result that the weight can not firmly be mounted on the shaft.

It is also desirable that a thickness between the recess and the inside wall surface of the insertion hole be formed over 0.5 time and under 1.0 time in relation to the shaft diameter.

The weight can be firmly fastened to the shaft by adopting the above-described desirable range of settings. When the thickness stated above is not less than 1.0 time the shaft diameter, the inside wall surface of the shaft insertion hole becomes hard to deform when the weight is pressed, and therefore the countershaft can not be fastened to the shaft. In case the thickness is under 0.5 time also, the weight-to-shaft holding pressure will decrease.

The method of mounting the weight to the vibration generating device of the present invention includes a process to insert the motor weight to the shaft, a process to hold the weight, and a process to apply a pressure to fasten the weight to the shaft. In the weight mounting method, a weight is of an approximately semicircular columnar section and has a shaft insertion hole partly open at center in the diametral direction and a recess in the vicinity of the open portion of the insertion hole. After the insertion of the shaft into the insertion hole of the weight, the weight is supported in such a manner that a line in a radial direction will be inclined, and a pressure is applied to the recess or the open end side of the recess by the use of a pressing member, that is, the pressure is exerted inwardly with respect to the axis of the shaft, to thereby fixing by caulking the weight to the shaft.

According to the above-described method, the weight is mounted on a special support block after the insertion of the weight onto the motor shaft. In this case, the weight is to be mounted on the support block in such a manner that the flat portion of the weight will be on an inclined line. After thus supporting the weight, a pressure is applied from above to the weight by the use of a pressing member. In this case, the pressing member contacts the recess formed on the weight or the open end side of the recess to further apply the downward pressure against the weight, thereby deforming the inside wall surface of the shaft insertion hole to fasten the weight to the shaft.

In the above-described case, it is desirable that the weight be pressed specially at the open end side of the recess by using the pressing member. The weight can be firmly mounted on the shaft by the above pressing method.

In this case the pressure is applied preferably in a center direction off the axis of the shaft. Since the direction of pressure application is deviated from the shaft as stated above, the pressure will not be applied directly to the shaft when a shock is given to the pressing member, and accordingly no damage will be given to the shaft.

It is advisable that the pressure be applied to the recess formed on either side of the shaft insertion hole or the open end side of the recess.

Other objects, features and advantages of the present invention become apparent from the following detailed description taken in connection with the accompanying drawings.

DESCRIPTION OF THE PREFERRED EMBODIMENTS

A vibration generating device and a method of mounting a weight to the vibration generating device will be described with reference to FIGS. 1 to 7.

Figure 1:
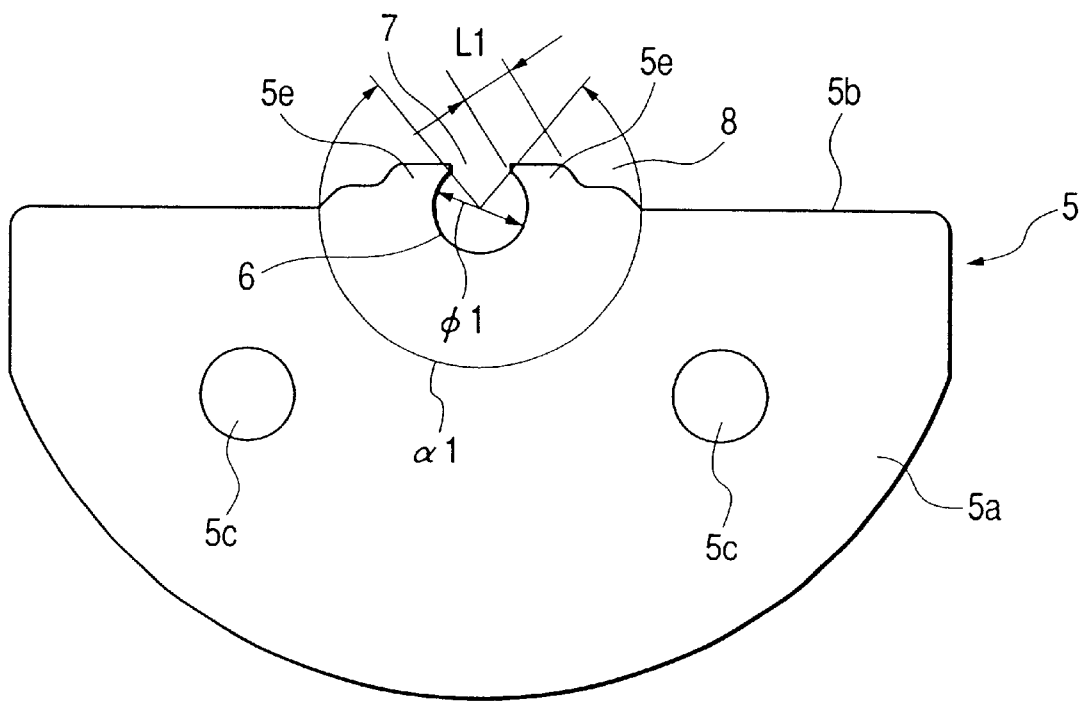
FIG. 1 is a front view showing the configuration of a weight of the present invention.
Figure 2:
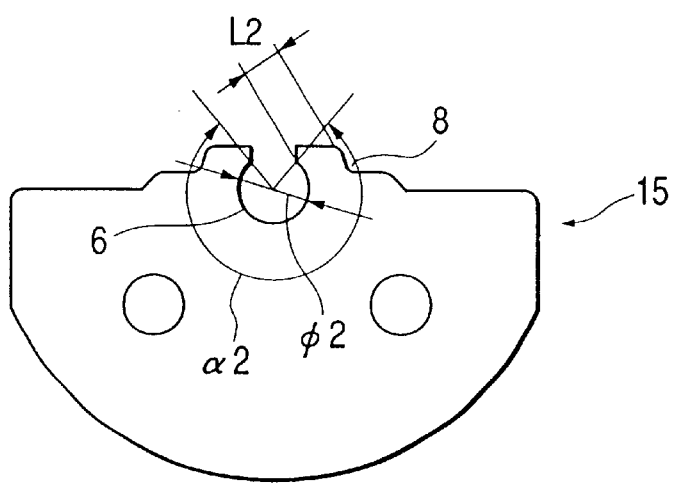
FIG. 2 is a front view showing the configuration of another embodiment of the weight of the present invention.

FIG. 1 and 2 are enlarged front view showing the configuration of large and small weights.

A weight 5 shown in FIG. 1 is formed of a body 5a having a semicircular, columnar section. In a projecting portion 5e provided outwardly at the central part of a flat portion 5b of the body 5a, an insertion hole 6 is formed inwardly for insertion of the shaft 3, and an opening 7 is provided in a part of the insertion hole 6. The insertion hole 6 is positioned at the center of the perimeter of the weight 5, projecting out of the line of the flat portion 5b. Therefore, the distance between the hole 6 and the center of gravity of the weight 5 becomes long; when the weight 5 turns in one body with the shaft 3, the maximum centrifugal force acts on the weight, so that the vibration generating device is capable of producing great vibrations.

A recess 8 is formed beside the insertion hole 6, directed inwardly, between the opening 7 and the flat portion 5b. On the other side of the insertion hole 6 also, there is symmetrically formed a similar recess.

In the present invention, it is desirable that the clearance between the shaft 3 of the motor 9 and the insertion hole 6 be $1/100$ mm or more and $8/100$ mm or less. If the clearance is under $1/100$ mm, it is difficult to gain the working accuracy, resulting in hard insertion of the shaft 3. Conversely if the clearance exceeds $8/100$ mm, the surface contact area between the inside wall surface of the insertion hole 6 and the shaft 3 decreases at the time of pressure application to the recess 8, and the weight 5 can not be firmly attached to the shaft 3. Particularly desirable is to observe the clearance measuring $3/100$ mm or more and $5/100$ mm or less.

The thickness between the recess 8 and the inside wall surface of the insertion hole 6 is desired to be formed 0.5 time or more and under 1 time with respect to the shaft diameter. In case the thickness exceeds the range mentioned above, the weight 5 can not be mounted firmly on the shaft 3.

In the weight 5 shown in FIG. 1, let $\phi 1$ be the diameter of the insertion hole 6, L1 be a clearance between the recess 8 and the insertion hole 6, and $\alpha 1$ be the angle of the insertion hole 6 enclosing the shaft 3, and their values are 2.01 mm, 1.1 mm, and 263 degrees respectively. In the case of the weight 5, L1 is formed at a rate of about 0.5 time with respect to $\phi 1$ A weight 15 shown in FIG. 2 is of a smaller type than, and of the same constitution as, the weight 5 shown in FIG. 1. Let $\phi 2$ be the diameter of the insertion hole 6, L2 be a clearance between the recess 8 and the insertion hole 6, and $\alpha 2$ be the angle of the insertion hole 6 enclosing the shaft 3, and their values are 1.52 mm, 0.8 mm, and 276 degrees respectively. Therefore, in the weight 15, L2 is formed at a rate of 0.5 time with respect to $\phi 2$.

The weights 5 and 15 mentioned above are formed of a relatively hard material such as iron or the like; more concretely, SECC is a suitable material for use. Since this type of material is easily workable to a specific accuracy and moreover is hard to deform, it is possible to prevent deviation and accidental removal of the shaft 3 after pressure application.

Figure 6:
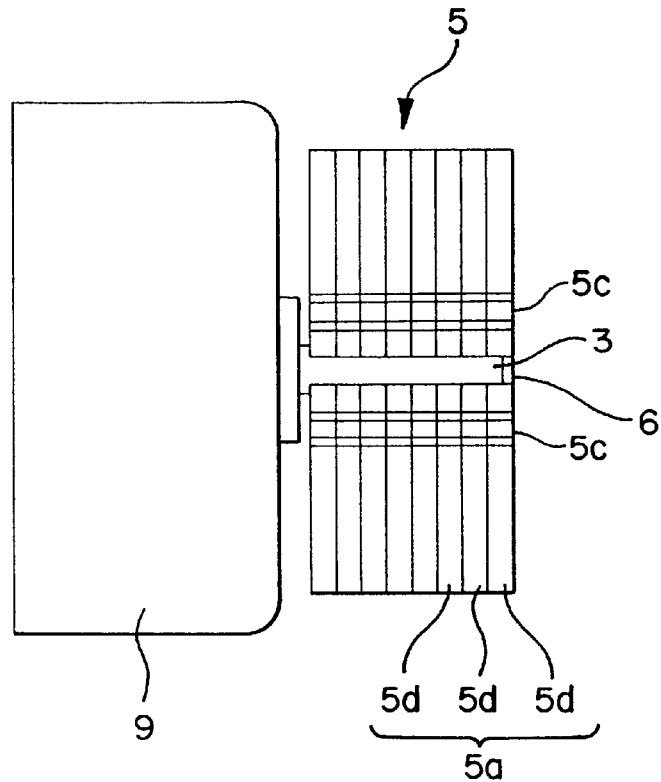
FIG. 6 is a front view showing the weight mounted on the motor shaft.
Figure 6A:
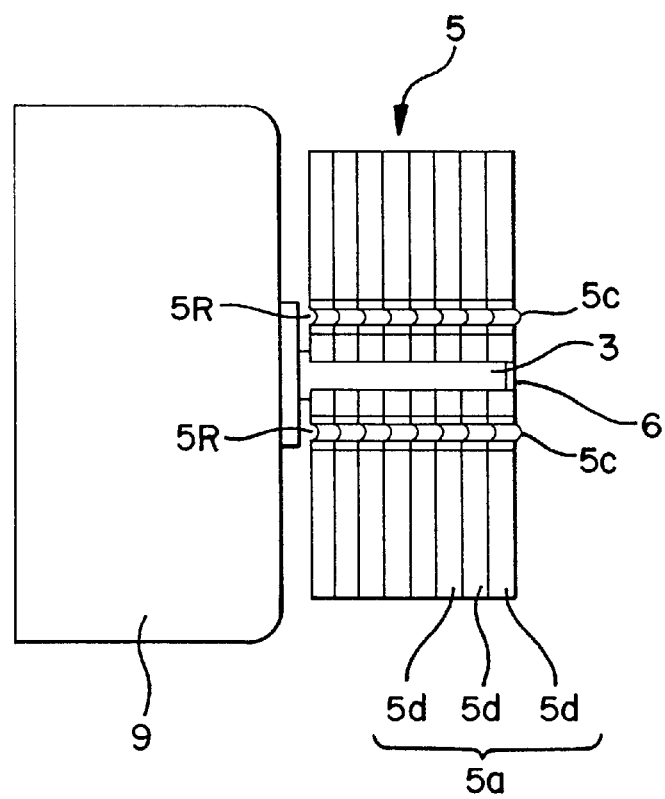
FIG. 6A is a front view showing the weight mounted on the motor shaft.

The weight 5 comprised of a plurality of thin plates 5d as shown in FIG. 6 is formed in a shape of column in the direction of length of the shaft 3.

Each of the thin plates 5 forming the body 5a of the weight 5 is provided with round projections 5c, 5c shown in FIG. 1.

Figure 5:
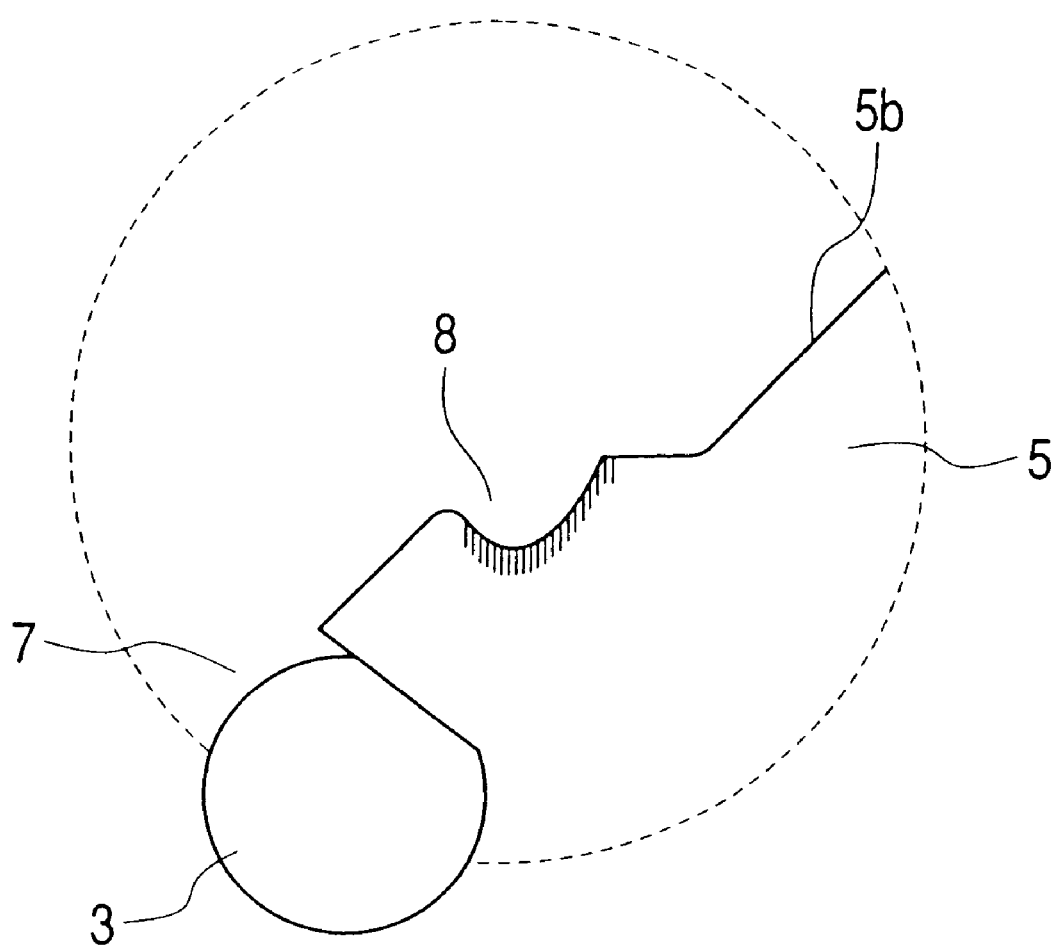
FIG. 5 is a partly enlarged front view showing the weight after mounting.

The projections 5c, 5c are formed by pressing from the other side simultaneously with punching the thin plate 5d of the weight 5; that is, recesses (for insertion of projections) are formed on the back side of the side having the projections 5c, 5c of the thin plate 5d. The weight 5 is formed by laminating the thin plates 5d while pressing the projections 5c, 5c into the recesses. As shown in FIGS. 5 and 6, the projections 5c can be positioned at a substantially equal radial distance from the shaft 3. The figures further illustrate that the distance between at least one projection 5c and the recess 8 is smaller than the distance between that projection 5c and the shaft 3.

The weight 15 also is formed in a shape of column in the direction of length by laminating thin plates similarly to the weight 5 described above.

Figure 3:
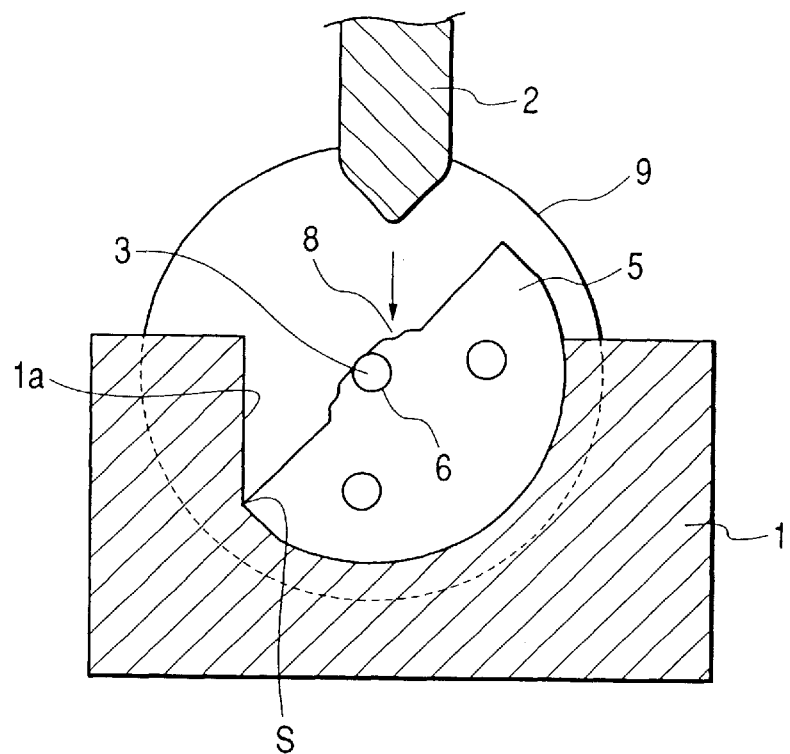
FIG. 3 is an explanatory view explaining a method of mounting the weight of the present invention to a shaft.

Next, the method of mounting the weight to the vibration generating device of the present invention will be described with reference to FIG. 3 to FIG. 5.

In the first process, the shaft 3 of the motor 9 is inserted into, and secured in, the insertion hole 6 of the weight 5. In this case, the insertion hole 6 encloses the shaft 3 at a larger angle than 180 degrees, and therefore the shaft will not slip off and down from the opening 7.

In the second process, the weight 5 thus mounted on the shaft 3 of the motor 9 is supported on the special support block 1. The support block 1 has a recess formed in the upper part of a square block to the same curved surface as the perimeter (curved portion) of the weight 5 and partly cut straight to the shape 1a. As shown in FIG. 3, therefore, when the weight 5 is mounted in the recess of the support block 1, its end portion will be caught at the point S of the support block 1 and held in an inclined position.

In the third process, with the weight supported in the recess of the support block 1, the pressing member 2 above the weight is lowered to apply a pressure to secure the weight 5 to the shaft 3. The pressing member 2 used at this time is a member gradually tapered toward the lower end. The lower end of the pressing member 2 is rounded and has a thickness so as to be fitted in the recess 8 of the weight 5. If the lower end of the pressing member 2 is too thick, a pressure will not be concentrated but dispersed when applied, failing in securing the weight 5 to the shaft 3. The pressing member 2 is fed vertically downwardly (in the direction of the arrow in the drawing) towards the open end side, near the shaft 3, of the recess 8 formed in the weight 5.

Figure 4:
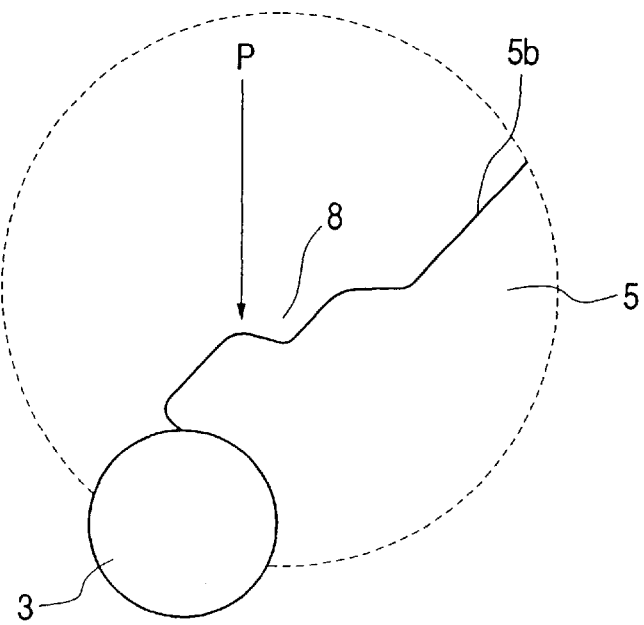
FIG. 4 is a partly enlarged front view showing the weight before mounting.

FIG. 4 is a partly enlarged front view showing the shape of the shaft and the recess 8 with the weight 5 set on the support block 1.

When the pressure of the pressing member 2 is applied to the open end side of the recess 8 near the shaft 3 from above the weight 5 as shown in FIG. 4, the pressure is applied in a direction indicated by the arrow P in the drawing. That is, the pressure is applied off the axis of the shaft 3.

FIG. 5 is a partly enlarged front view showing the shape of the recess 8 after pressure application.

As the pressure is applied to the weight 5 by the method shown in FIG. 4, the recess 8 is further depressed with the pressure of the pressing member 2, and the thick part of the projecting portions 5e between the recess 8 and the inside wall surface of the insertion hole 6 is pressed against the shaft 3 side. The inside wall surface of the insertion hole 6 in the vicinity of the opening 7 is pressed towards the shaft 3 side, thereby pressing the shaft 3. In this case, the inside wall surface of the insertion hole 6, being preformed to the same curved surface as the perimeter of the shaft 3, contacts the shaft 3, mutually at about two wide surfaces, along the curved surface of the shaft 3. Thus the weight 5 is firmly and reliably fixed by caulking to the shaft 3. The opening 7 functions as a clearance which allows smooth approach of the inside wall surface of the insertion hole 6 towards the shaft 3 side.

Figure 7A:
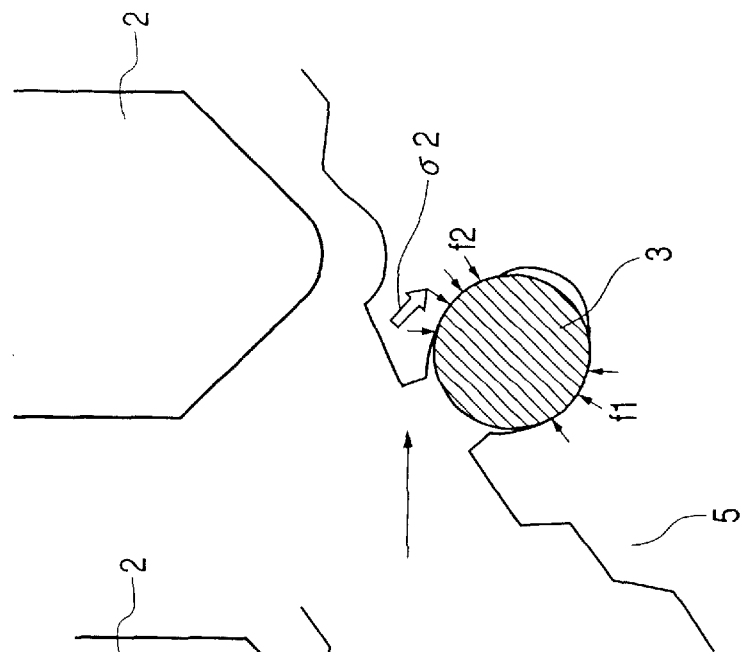
FIGS. 7A to 7C are explanatory views explaining a process for caulking the weight to the shaft.
Figure 7B:
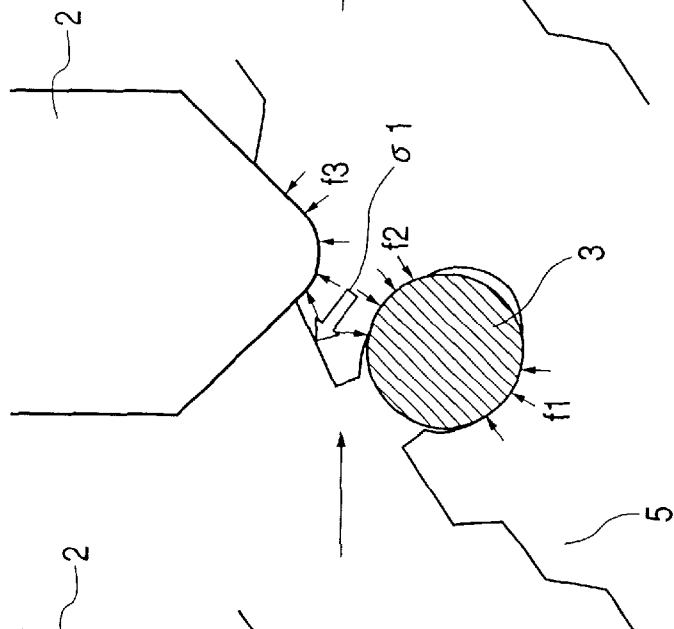
Figure 7C:
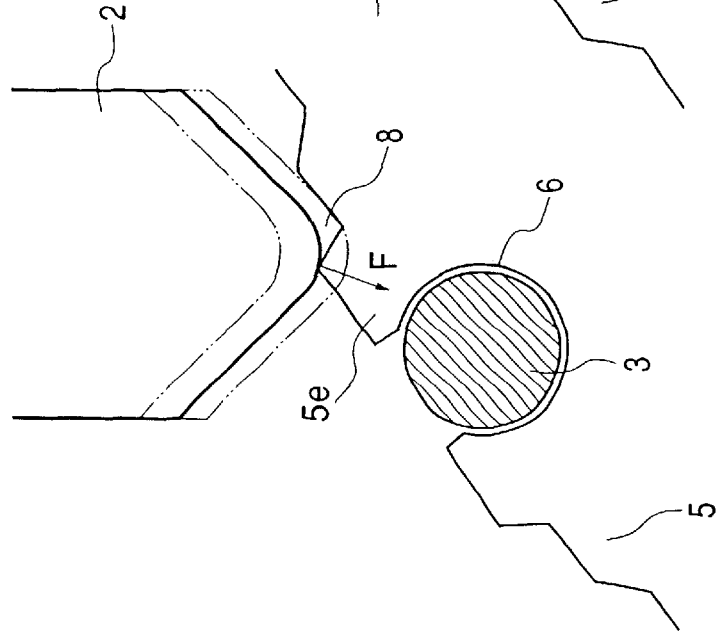
Figure 8:
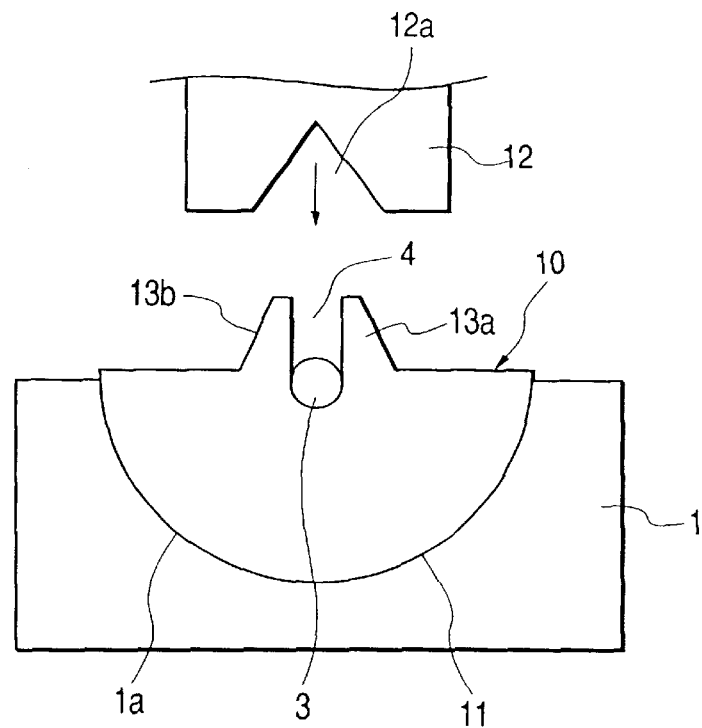
FIG. 8 is an explanatory view showing the configuration of a conventional weight and the state of the weight before mounting to the shaft.
Figure 9:
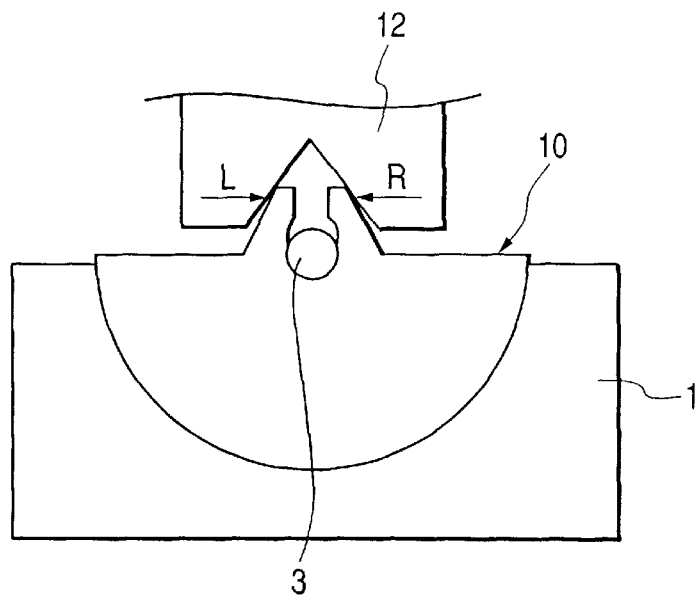
FIG. 9 is an explanatory view showing the conventional weight after mounting.

Further referring to FIGS. 7A to 7C, the pressure application will be described in detail. FIGS. 7A to 7C are explanatory views for explaining the process for caulking the weight 5 to the shaft 3, in which FIG. 7A shows the weight at the beginning of pressure application; FIG. 7B shows the weight during pressure application; and FIG. 7C the weight after pressure application.

In FIG. 7A, the pressing member 2 applies the pressure vertically downwardly to the open end side of the recess 8 and off the axis of the shaft 3. In this case, the pressing member 2 descends from above the opening end side of the recess 8, comes into contact with the surface of the recess 8 on the open end side, and is further pressed. At this time, the pressure F of the pressing member 2 works towards (in the direction of the arrow) the shaft 3.

In FIG. 7B, with pressure application by the pressing member 2, stresses f1 and f2 acts on the shaft 3 secured in the weight 5; and in the weight 5 a stress f3 is produced by the elastic force of the weight 5 itself to push back the pressing member 2. Furthermore, with the pressure application by the pressing member 2, a strain σ1 is produced in the weight 5 towards (in the direction of the arrow) the projection 5e enclosing the shaft 3.

In FIG. 7C, the pressing member 2 goes up away from the weight 5. At this time, the stress f3 is released by the elastic force of the weight 5 itself and simultaneously the strain σ1 is forced back as σ2 (spring back) in the direction of the arrow by the elasticity, thereby reliably fastening the weight 5 to the shaft 3 in the insertion hole 6 and holding a caulking strength.

After a proper amount of part to be caulked is obtained, the contact surface area of the pressing member 2 and the weight 5 gradually increases with further pressure application, making it possible to control the caulking strength by the pressure applied by the pressing member 2. Moreover, since no control is needed for detailed pressure settings, it is possible to set the caulking strength by controlling an air pressure of an air cylinder or the like.

The vibration generating device formed as described above is built in a TV or personal computer game controller. The shaft 3 of the motor 9 rotates to swing the weight 5 depending on a scene in a game, thereby generating vibrations so that a game player will be able to feel the game more realistic.

In the vibration generating device of the present invention, as heretofore explained, the configuration of the device is not be limited to that stated in the embodiments and the angle of the insertion hole which encloses the shaft may be changed in accordance with the size of the weight and the diameter of the shaft.

In the method of mounting the weight of the present invention, it is possible to adjust the mounting angle of the weight to be supported, according to the shape of the recess.

What is claimed is:

1. A method of mounting a weight to a vibration generating device including a process for inserting said weight onto a motor shaft, comprising the steps of: inserting said shaft into said weight which is of a approximately semicircular and columnar section and is provided with a shaft insertion hole partly open at a center in a radial direction; said weight having a recess in the vicinity of said open part of said insertion hole and at least one projection disposed on a side; holding said weight along an inclined line in the radial direction; and applying a pressure to said recess or to an open end side of said recess, inwardly towards a rotational axis of said shaft, by the use of a pressing member to fasten said weight to said shaft, wherein said pressing member is a single curve ended device that applies said pressure through said single curve end to only a single portion of said weight away from a perimeter of said shaft.

2. A method for mounting a weight to a vibration generating device according to claim 1, wherein said weight further comprises a back side positioned directly across from said side, the back side having a recess enclosed by said at least one projection.

* * * * *

UNITED STATES PATENT AND TRADEMARK OFFICE
CERTIFICATE OF CORRECTION

PATENT NO. : 6,288,459 B1
DATED : September 11, 2001
INVENTOR(S) : Toshio Furudate et al.

It is certified that error appears in the above-identified patent and that said Letters Patent is hereby corrected as shown below:

<u>Title page,</u>
Item [54], Title, change "VIBRATION GENERATING DEVICE, AND METHOD FOR MOUNTING WEIGHT TO THE SAME" to -- VIBRATION GENERATING DEVICE HAVING A WEIGHT CAULKED TO A SHAFT AND METHOD FOR CAULKING A WEIGHT TO A SHAFT --

Signed and Sealed this

Eighteenth Day of March, 2003

JAMES E. ROGAN
*Director of the United States Patent and Trademark Office*